(12) United States Patent
Sheeley

(10) Patent No.: US 8,547,414 B2
(45) Date of Patent: Oct. 1, 2013

(54) TOUCH SCREEN VIDEO SWITCHING SYSTEM

(75) Inventor: Robin Sheeley, Maple Plain, MN (US)

(73) Assignee: New Vad, LLC, New Hope, MN (US)

( * ) Notice: Subject to any disclaimer, the term of this patent is extended or adjusted under 35 U.S.C. 154(b) by 349 days.

(21) Appl. No.: 13/027,372

(22) Filed: Feb. 15, 2011

(65) Prior Publication Data

US 2012/0194632 A1 Aug. 2, 2012

Related U.S. Application Data

(60) Provisional application No. 61/437,865, filed on Jan. 31, 2011, provisional application No. 61/437,890, filed on Jan. 31, 2011, provisional application No. 61/437,882, filed on Jan. 31, 2011, provisional application No. 61/441,103, filed on Feb. 9, 2011.

(51) Int. Cl.
*H04N 7/14* (2006.01)
*G06F 3/041* (2006.01)

(52) U.S. Cl.
USPC ........ 348/14.03; 345/173; 345/207; 345/420; 348/14.11; 348/47; 348/157; 348/584; 348/722; 455/413; 455/420; 463/20; 463/34; 463/42; 701/450; 705/41; 715/719; 715/723; 725/32; 725/61; 725/146

(58) Field of Classification Search
USPC .......... 345/173, 420, 207; 348/14.03, 14.11, 348/47, 143, 157, 584, 722, 333.02; 455/41.3, 455/420, 413; 463/42, 20, 34; 705/41; 715/719, 723; 725/32, 61, 146; 701/450
See application file for complete search history.

(56) References Cited

U.S. PATENT DOCUMENTS

| | | | | |
|---|---|---|---|---|
| 5,715,018 A * | 2/1998 | Fasciano et al. | ............ | 348/722 |
| 6,508,709 B1 * | 1/2003 | Karmarkar | ...................... | 463/42 |
| 6,839,080 B2 * | 1/2005 | Meyers | ...................... | 348/14.11 |
| 7,285,048 B2 * | 10/2007 | Karmarkar | ...................... | 463/42 |
| 7,735,111 B2 * | 6/2010 | Michener et al. | ............. | 725/146 |
| 7,907,203 B2 * | 3/2011 | Sugiyama et al. | ........ | 348/333.02 |
| 7,952,563 B2 * | 5/2011 | Park et al. | ..................... | 345/173 |
| 8,111,252 B2 * | 2/2012 | Nozawa | ......................... | 345/207 |
| 8,123,618 B2 * | 2/2012 | Karmarkar | ...................... | 463/42 |
| 8,150,387 B2 * | 4/2012 | Klein et al. | .................. | 455/420 |
| 8,162,743 B2 * | 4/2012 | Beaulieu et al. | ................ | 463/20 |

(Continued)

OTHER PUBLICATIONS

Jun. 4, 2013 Office Action (U.S. Appl. No. 13/027,377).

(Continued)

*Primary Examiner* — Gerald Gauthier
(74) *Attorney, Agent, or Firm* — Beck & Tysver PLLC

(57) ABSTRACT

The present invention is a video production and control system that uses a touch screen display and user interface, managed by a controller, for video switching. The system is used to select Preview and Program video feeds from a set of video input feeds. The video source configuration for some of the feeds may have been selected using touch screen video source control technology. Over time, the user can use the touch screen controls to switch which feeds are then designated as the Preview and Program feeds. The evolving Program signal is sent to a Program output connection for consumers of the Program, possibly after some reformatting. The current Program feed may be promoted from the current Preview feed. User controls determine the type of transition, such as cut or crossfade, that will apply to a transition from Preview to Program.

17 Claims, 12 Drawing Sheets

(56) References Cited

U.S. PATENT DOCUMENTS

| | | | |
|---|---|---|---|
| 8,241,124 B2* | 8/2012 | Kelly et al. | 463/34 |
| 8,315,799 B2* | 11/2012 | Alewine et al. | 701/450 |
| 2003/0122924 A1* | 7/2003 | Meyers | 348/14.11 |
| 2004/0047354 A1 | 3/2004 | Slater et al. | |
| 2005/0050218 A1 | 3/2005 | Sheldon | |
| 2005/0171906 A1* | 8/2005 | Sean Shek et al. | 705/41 |
| 2007/0038567 A1 | 2/2007 | Allaire et al. | |
| 2007/0043766 A1* | 2/2007 | Nicholas et al. | 707/104.1 |
| 2009/0183078 A1* | 7/2009 | Clement et al. | 715/723 |
| 2009/0187826 A1* | 7/2009 | Heimbold et al. | 715/719 |
| 2010/0026809 A1* | 2/2010 | Curry | 348/157 |
| 2010/0130132 A1* | 5/2010 | Lee et al. | 455/41.3 |
| 2010/0251287 A1* | 9/2010 | Deshpande et al. | 725/32 |
| 2011/0102678 A1* | 5/2011 | House et al. | 348/584 |
| 2011/0128377 A1* | 6/2011 | Katz et al. | 348/143 |
| 2011/0216167 A1* | 9/2011 | Katz et al. | 348/47 |
| 2011/0296473 A1 | 12/2011 | Babic | |
| 2011/0310100 A1* | 12/2011 | Adimatyam et al. | 345/420 |
| 2012/0011442 A1* | 1/2012 | Fay et al. | 715/723 |
| 2012/0062471 A1* | 3/2012 | Poulidis et al. | 345/173 |
| 2012/0062473 A1* | 3/2012 | Xiao et al. | 345/173 |
| 2012/0194442 A1* | 8/2012 | Sheeley | 345/173 |
| 2012/0194632 A1* | 8/2012 | Sheeley | 348/14.03 |
| 2012/0198500 A1* | 8/2012 | Sheeley | 725/61 |

OTHER PUBLICATIONS

Aug. 2, 2013 Response to Office Action (U.S. Appl. No. 13/027,377).

* cited by examiner

FIG. 4 SOURCE CONTROL

| | 1000 | 1001 | 1002 | 1003 | 1004 |
|---|---|---|---|---|---|
| | TYPE | INITIAL STATE | DESIRED RESPONSE | USER ACTION SENSED | CONSEQUENCES |
| 1020 | VS | FEED 2 IS PROGRAM. FEED 4 IS PREVIEW. | PROMOTE FEED 4 TO PROGRAM. | PRESS PREVIEW WINDOW. | FEED 4 TRANSITIONS TO PROGRAM ACCORDING TO SELECTED METHOD. FEED 2 BECOMES PREVIEW. |
| 1021 | VS | FEED 4 IS PROGRAM. FEED 2 IS PREVIEW. | PROMOTE FEED 1 TO PREVIEW. | PRESS FEED WINDOW 1. | FEED 1 PRESET THUMBNAILS ARE DISPLAYED. PREVIEW WINDOW SHOWS FEED 1. |
| 1022 | SC | FEED 1 IS PREVIEW. THUMBNAIL FOR PRESET CONFIGURATION 1C IS CURRENTLY SELECTED. | CHANGE VIDEO SOURCE 1 TO PRESET CONFIGURATION 1E. | PRESS THUMBNAIL 1E. | THUMBNAIL 1E IS EMPHASIZED. CONTROL DATA CORRESPONDING TO PRESET 1E ARE SENT TO VIDEO SOURCE. PREVIEW WINDOW AND WINDOW FOR FEED 1 DISPLAY VIDEO ACCORDING TO NEW PRESET. |
| 1023 | SC | FEED 4 IS PROGRAM. FEED 1 IS PREVIEW. | INTERACTIVELY RECONFIGURE VIDEO SOURCE FOR FEED 3. | PRESS AND HOLD FEED 3 WINDOW FOR FOUR SECONDS THEN MANIPULATE GUI OR CONTROL PANEL CONTROLS. | FEED 3 IS PROMOTED TO PREVIEW. PREVIEW WINDOW AND WINDOW FOR FEED 3 DISPLAY VIDEO ACCORDING TO NEW PRESET. |
| 1024 | SC | FEED 4 IS PROGRAM. FEED 3 (PREVIEW) HAS BEEN INTERACTIVELY RECONFIGURED AS IN PREVIOUS TABLE ROW. | SAVE NEW CONFIGURATION FROM INTERACTIVE RECONFIGURATION AS PRESET 3B. | PRESS THUMBNAIL 3B. | CONTROL DATA TO SPECIFY NEW CONFIGURATION OF VIDEO SOURCE 3 IS STORED. CURRENT VIEW FROM VIDEO SOURCE 3 IS STORED AND IS DISPLAYED AS NEW THUMBNAIL 3B. |

FIG. 10

TOUCH SCREEN VIDEO SWITCHING SYSTEM

CROSS-REFERENCES TO RELATED APPLICATIONS

This application claims the benefit of U.S. Provisional Applications Ser. Nos. 61/437,865, 61/437,890, and 61/437,882, filed Jan. 31, 2011, and Ser. No. 61/441,103, filed Feb. 9, 2011, each hereby incorporated by reference. This application is related to U.S. patent application No. 13/027,367, entitled "Touch Screen Video Source Control System", filed Feb. 15, 2011, and hereby incorporated by reference. This application is also related to U.S. patent application Ser. No. 13/027,377, entitled "Touch Screen Video Production and Control System", filed Feb. 15, 2011, and hereby incorporated by reference. This application is also related to U.S. application Ser. No. 11/527,120, entitled "Presentation Video Control System", filed Sep. 9, 2006, and hereby incorporated by reference.

FIELD OF THE INVENTION

The present invention relates to production of video output from video sources. More specifically, it relates to a system and method for touch screen video switching.

SUMMARY OF THE INVENTION

Video source control includes changing the configuration or parameter settings of a video source, such as a camera. For example, a set of remote control cameras might be installed in a conference room to televise the meetings of a government body. A given camera might first focus on the face of a speaker at a podium, then move to a whiteboard presentation, and then track the speaker through the room. For a camera, configuration parameters include, for example, pan, tilt, zoom (PTZ), and focus settings; color model; and white balance. A camera may be physical or virtual. A virtual camera's view might be computed from views of physical or other virtual cameras, or it might be an entirely computed view of a virtual environment.

The concept of video source control is quite broad, and includes, for example, selecting particular slides from a business presentation on a laptop computer, switching a browser view to a different URL on the Internet, or updating the firmware on a physical camera. Video source control might also include querying the source for information, such as regarding its state (e.g., send your model and serial number), policies (send your hours of operation), or environmental conditions (send the temperature in the meeting room).

Video source control (and, in particular, camera control) is done by a controller, which may respond to instructions from, for example, a person or a computer. A touch screen surface may be coupled to a controller to display the input feed from a video source, which has some current configuration, and to provide a user interface, whereby a user can send control data to the video source. The control data might include instructions, parameters, or requests for information. For example, the command might cause a camera to focus on a whiteboard with specified PTZ settings. The view from that camera displayed on the touch screen will change as a result of the command.

A touch screen is a device that can be used to present video information while monitoring user interaction with an interface of controls of the screen surface. When a typical touch screen senses a touch, it sends an event that includes the touch location to a controller. The controller can then interpret that event as a user request for some action. A touch screen can be integrated, for example, with a computer monitor, a television monitor, a tablet device, a handheld electronic device, or a monitor that is built into some kind of control system.

A sequence of touch screen events, possibly in addition to some location data, can itself be regarded as a touch screen event. A request from the user to perform a certain task may require several touches of touch screen controls, as well as entry of data. We will treat the term "touch screen event" as comprising the set of events required for the controller to recognize it has a task to perform, and to execute that task. Therefore, a touch screen event may involve multiple simultaneous touches of the screen, and some rather complex motions, such as multiple taps, a finger stroke, spreading or narrowing the distance between a pair of fingers, rotating a pair that are in contact with the surface, or combinations of any of these. A touch screen event may take into account other physical parameters of a touch interaction, such as speed, distance, and rotation rate. Responsibility for interpreting such combinations or sequences as individual events may be the responsibility of the touch screen, the controller, or some combination of the two.

In embodiments that include video source control, the touch screen may display a plurality of thumbnail images for a given video source, each thumbnail indicating a particular preset configuration. Preferably, the thumbnail will be an image captured from that source when the source has the corresponding configuration. For a given source, there may be any number of thumbnails, limited primarily only by the geometry of the screen. For a given video source, touching a particular thumbnail is an example of a user input that might cause the controller to send control data associated with the preset configuration through a control communication channel. The video source, upon receiving these data, may assume the preset configuration, correspondingly altering the video feed for that source that is being displayed on the touch screen.

The video production and control system may also facilitate the changing of the configuration associated with a given preset. Touching a currently selected thumbnail, or some other user touch activity, might enable controls that enable a user to modify the configuration. These controls might be touch controls on the touch screen itself, possibly in a separate graphical user interface (GUI) on the touch screen; directly on a window showing a video feed from that source; or they could be tactile physical controls (e.g., buttons, dials, levers, joysticks) on a separate control panel. Such controls might, of course, be redundant of the touch screen controls, with some elements of control being provided by more than one of these user interfaces (UIs). The system might also allow reconfiguration of a video source without creating or modifying any preset.

Note that a "video feed" can refer to a physical video feed or a logical video feed. A physical video feed has a given format, including a resolution, a frame rate, a size, an aspect ratio, a color model, and so forth. As a signal moves through the video production and control system, it may undergo a number of physical transformations, while maintaining the same logical content. A logical video feed represents what a camera or other source is capturing at a given time, independent of the format that signal is being represented, but inclusive of the configuration of the source/camera. In other words, the logical video feed is the content of the video, possibly motion video, as being captured by the source. Throughout this document, when we refer to a video feed, we ordinarily mean a logical feed. When a physical feed or signal is intended will be clear from the context.

The touch screen may display feeds from several different video sources each, for example, in a separate window. A user command may be given to the controller through the touch screen to cause it to select one of the video sources. A user command may cause the controller to display the preset thumbnails for that video source. For example, touching a given video source window might both select that source and cause the corresponding set of thumbnails to display, with the currently selected preset indicated or emphasized.

Video feeds input to a system, may be communicated as system outputs. For example, a system with video source control may take input feeds from six remotely controlled cameras. A technician can use the video source control functionality of the system to manipulate the content of the set of feeds during a video production by changing the view configuration of some or all of the cameras in order to follow live action as it evolves. Up to six feeds could be output by such a system. Those outputs might then be used as inputs to a video switching system, such as the touch screen video switching system described below.

Switching from one video feed to another, from among several input video feeds, to produce a Program output, is the task of a video switcher. Video switching is a separate and distinct concept from video source control, but, as will be described below, the two can be synergistically combined together in a single touch screen video production and control system. As an example of video switching, consider the broadcasting of a baseball game, in which several cameras are used. Separate cameras might be used, for example, to focus on the pitcher, the batter, the ball, the scoreboard, and the fans. The feeds from each of these cameras might be displayed in a window on a touch screen. At any given time, aside from various insets and composites, one of the video feeds, the Program feed (also known as the "main" or "hot" feed), is the primary Program output broadcast to viewers. The Program output is "consumed" by everyone downstream of the system, including, for example, a television network and its home viewers.

Customarily in the industry, at any given moment in a video production, a video input feed other than the Program feed is designated as Preview. Ordinarily, the Preview feed is selected by a producer or technician with the idea that the Preview feed will at some future time become the next Program feed. So, at any given moment, there is a set of incoming video feeds, one of which is selected as Program feed, and another as Preview feed. Any one of the video feeds that are currently neither Preview nor Program might be selected as the next Preview feed.

A touch screen, in conjunction with a controller, can be used to implement video switching in a video production and control system. The various input feeds might be displayed, each in a separate window on the touch screen.

Through the touch screen user interface, a user may be able to specify to the controller the number of various windows and controls, and their layouts on the touch screen. The controller will store this configuration information, and use to interpret user touches as commands. In other embodiments, the number of windows and/or their layouts may be fixed, or perhaps limited by some constraint on the maximum number of input feed connections.

By touching appropriate controls, a user can specify a transition mode, transition a Preview feed into the Program feed, or promote a feed into the Preview feed. For example, a might display two rows of windows and a GUI. The GUI could have a number of touch controls, such as buttons, scrollbars, text windows, and menus. The top row of windows might display the current Program and Preview feeds. Another row of windows might show all feeds (or optionally, all feeds except Program and Preview). Any of the windows might have textual or iconic labels supplied by a user through the UIs. Touching a window displaying the Program feed might swap the Preview and Program feeds. Alternatively, pressing a touch screen button labeled "Take" might cause Program and Preview to be swapped. Touching any window in the all feeds row might cause that window to be highlighted or otherwise indicated as selected. Then touching the Preview feed moves whichever video feed is currently selected into the Preview window. In some embodiments, touching the Preview window may initiate the swap. Touching a feed window may promote that feed to Preview.

When a new feed is selected to be the Program feed, that feed will be output through the Program output communication system, for example, through a communication port. One reason for having a Preview selection and a Preview window is to facilitate smooth transitions from Preview to Program output. GUI buttons on the touch screen might provide various options for how transitions are done. Choices could include, for example, cut, fade, crossfade, and/or wipe. There might be a global default type of transition, such as crossfade, but the user might be able to handle a particular transition by another technique. Through the UI of the touch screen, the user might also be able to specify parameters of the transition, such as timing or speed.

Video source control and video switching can be combined into a single touch screen system. To illustrate this, consider the example layout discussed above in which a video switching system has a top row of windows displaying Program and Preview feeds, and a second row of windows displaying the content of all video input feeds. A bottom, third row of windows might be included that shows preset thumbnails for the currently selected window of the middle, all-feeds, row. While a given feed window is selected, camera control functions, including changing to a different preset configuration or creating a new preset configuration, are possible. Video switching could operate with the touch sequences already described. For example, press crossfade to set a transition type. Press the Program window to swap the Preview and Program feeds according to a user-specified transition mode. Press the Preview window to promote the currently selected window from the all-feeds row to Preview. Of course, many other touch screen configurations and command sequences are possible within the scope of the invention.

Again, it should be mentioned that a given feed signal may undergo a number of transformations as it moves through the system. Standardization is an important consideration. Signals may be standardized at various stages for bit depth, color model, frequency, synchronization, size, aspect ratio, and other factors. Additional transformations may be performed on any feeds that are output from the system. In the case of a system providing only video source control, all or some subset of the input feeds may be output. For a system providing video switching, the Program feed will be output for consumers.

A control panel with conventional tactile controls might be provided to supplement the touch screen for control of camera configuration and/or control of video switching. The reasons for doing so include (1) redundancy in case of equipment failure; (2) better familiarity of a system operator with some traditional controls than with their touch screen counterparts; or (3) more accurate or efficient performance of particular tactile controls for some operations. For example, some users feel that precise manipulation of camera PTZ configuration is more easily achieved with a joystick than with touch screen control workalikes. Nevertheless, a touch screen alone can be configured to handle all requirements to implement the UI of a system having video source control and/or video switching. Such a touch screen might employ any of the windowing and UI techniques known in the art.

This Summary section has been written to illustrate concepts of the invention for the reader. As such, some simplifications have been made for clarity that should not be taken to limit the scope of the invention. Some embodiments of a "system" may end at its input ports, output ports, and user interface. For example, the system apparatus may be regarded as including logic and hardware for receiving video feeds through its input ports, sending control information through control ports, sending video through output ports, and sensing touch and other control events through its UIs. In such a case, the external communication systems, the cameras and other video sources, the consumer of output video (which might, for example, be a video recorder or a monitor) and the users that interact with the apparatus are all regarded as being external to the "system". In other embodiments, a system apparatus might be regarded as including some or all of communication systems to video sources and video consumers; video sources; and video consumption equipment. The invention encompasses processes or methods that use the kinds of functionality that an apparatus as described herein provides.

BRIEF DESCRIPTION OF THE DRAWINGS

FIG. 10 is a table showing a scheme, alternative to FIG. 3-7, for touch control of the video feeds in a touch screen video production and control system.

DETAILED DESCRIPTION OF EXEMPLARY EMBODIMENTS

This description provides embodiments of the invention intended as exemplary implementations. The reader of ordinary skill in the art will realize that the invention has broader scope than the particular examples described here.

Overview

A video production is a Program output typically constructed from several video source inputs or feeds. A video production might cover an event such as a public meeting of a government body, a sporting event, a presentation or lecture, a church service, an operatic performance, or a music video production. In any of these contexts, several cameras might be used to capture content from various people or portions of the forum or setting. A production of a documentary about some political event might need to knit together segments of recorded video, segments in which the show host speaks, and segments in which various historians discuss the context and consequences of the event. A lecture might alternate between views of a presentation software slide deck, the lecturer speaking, the audience, a whiteboard, recorded video clips, and information displayed through a web browser. Transitioning among a set of input video feeds to produce a single program output is the process known as "video switching".

A camera, or other video source, might conceivably be configured only once at the start of creating a production, or might need to be reconfigured several times, perhaps frequently, throughout the course of the production. Video source control, or camera control in particular, is the process of commanding a video source to assume a certain configuration.

Configuration of a given source might be done automatically, by a controller. Configuration may also be done manually by a producer or a technician. Automatic configuration of a source might be done, for example, using tracking logic or triggers that follow the movements of a lecturer. Manual configuration might be used, for example, to move a video camera among different people in an audience, or to follow the "action" of a sports event. Manual configuration might be done remotely; that is, without direct contact by a user with controls on the camera itself.

Figure 1:
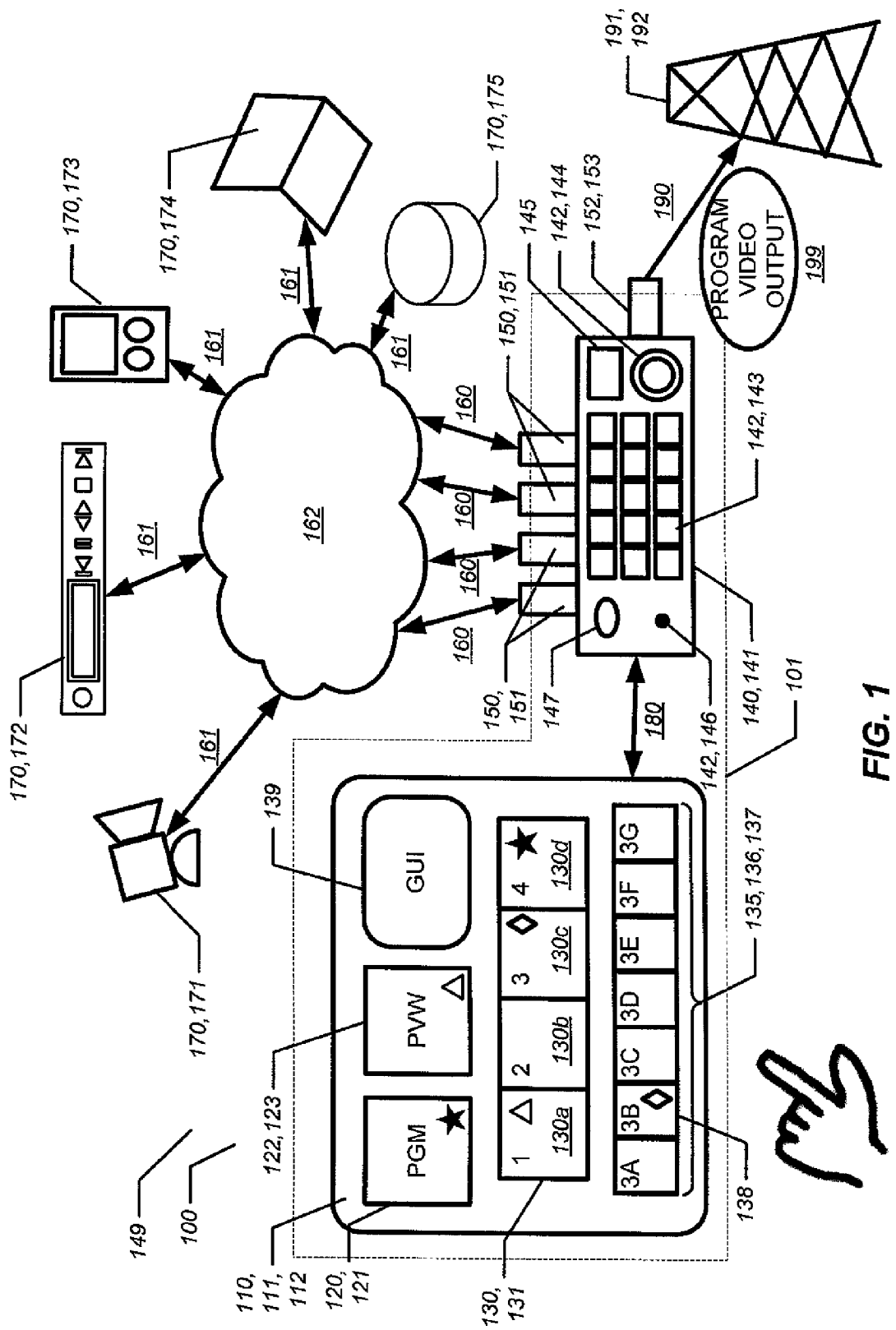
FIG. 1 is a schematic drawing of a touch screen video production and control system having video source control and video switching.

FIG. 1 is a schematic drawing of an embodiment of a touch screen video production and control system 100 having both video source control and video switching. The system 100 includes a touch screen 110 having a touch screen display 112 integrated with touch screen UI 111. The touch screen UI 111 may include a GUI 139. The video production and control system 100 is managed by a controller 141, which in this particular embodiment is housed in a unit having a control panel 140 employing various tactile controls 142, such as traditional buttons 143, knobs 146, switches, levers, and joysticks 144. We will use adopt the term "tactile controls" to distinguish these traditional physical controls from touch screen UI 111 controls, despite the fact that touch screen UI 111 controls are themselves "tactile". The control panel 140 may also have various indicators such as LEDs 147, and a control panel display 145.

The controller 141 can communicate with video sources 170 using various communication technologies, devices, channels and pathways 160, 161, and communication system(s) 162. The controller 141 connects to such communication channels by video source interfaces 150, which may or may not be physical video source connectors 151. Communication from a given video source 170 may include a video feed, and may include one-way or two-way control communication between the controller 141 and the video source 170. In one-way control communication, the controller 141 sends control data to the video source 170, possibly causing the video source 170 to change its configuration. Two-way communication adds feedback from the video source 170 through the control channel, possibly of identity, location, set-up information, status, event occurrence, or environmental conditions.

The video switching portion of the video production and control system 100 produces Program video output 199, transmitted through a video Program output connection 152 (which may or may not be a Program output connector 153), then through a communication system 190 to a Program consumer 191, which might be, for example, a broadcast system, a recording device, a closed circuit television system, an Internet stream, or simply a cable to a monitor. In FIG. 1, a broadcast tower 192 is used to represent a typical Program consumer 191.

Video Sources

Generally

The system 100 will have at least one video source interface 150 communicably connectable with a video source 170. In a video production and control system 100 with video source control only, there need be only a single video source interface 150, although more typically there will be more than one. In a video production and control system 100 with video switching, there will be at least two input feeds 131 to allow switching. More typically a system will support four or more video feeds 131. For example the system 100 illustrated in FIG. 9 has six. In principle, there is no upper limit to the number of video source interfaces 150 and feeds 131 for any touch screen video production and control system 100. In practice, however, the number of video source interfaces 150 may be limited in a particular system by the capacities of various elements, such as geometry of the touch screen 110, bandwidth of communication links, speed of a controller processor 200, or size of a physical box housing a controller 141.

A video source 170 may be of any type, although typically two or more of the video source interfaces 150 will provide motion video, in the sense of a sequence of frames intended to depict motion, in a digital and/or analog signal. A video feed 131 depicting motion might originate from a video source 170 such as a video camera 171, a video playback device 172 (e.g., a digital video recorder (DVR) or a video tape/cassette recorder (VTR/VCR)), or a handheld media device 173 (e.g., a media player or a cell phone), a computer 174, or a storage device 175 (e.g., a flash drive, hard drive, or solid state drive). A source 170 might be a location addressable across a network, for example, a website addressable by its URL.

A given video source interfaces 150 may provide one or more discrete static files. Such a static file might include a document, or a single image or collection of images. Images might be provided sequentially on a pull basis; that is, upon request from the system 100 to the video source 170. The ability to interleave motion video with still images is important in many video productions.

In FIG. 1, a box housing a controller 141 is depicted with four video source interfaces 150. The video source interfaces 150 might use any means of wired or wireless connection to the outside world. For example, a touch screen video production and control system 100 might be installed to cover meetings of a class, a club, or a government body. In such a case, hardware video source connectors 151 might connect the system 100 to remote control cameras 171 by means of hard-wired cables (e.g., USB, RS-232, or HDMI). Such cameras 171 might provide digital or analog signal, in a variety of formats (including timing, resolution, aspect ratio, and synchronization). The system 100 can be configured to accommodate such variety through its choice of connectors and processing components. A controller 141 box may provide slots for insertion of cards, each card an interface to a communication system(s) 162. The cards can have a wide variety of types. Preferably, a card will do the bulk of formatting required to standardize its input signal required, with the controller 141 specifying the standard format.

A given video production and control system 100 with video switching might or might not include video source control. If it does not, then one or more of the video sources 170 input to the video production and control system 100 might be the output of an external video source control system.

Video Source Control

If the system 100 has video source control, at least one video source interface 150 will allow the system 100 to receive a video input feed from, and to transmit control data to, a source 170. As will be described later, for such a video source interface 150, the video feed 131 input and the video source interfaces 150 may use the same, or different, communication ports, technologies and/or pathways. The video source interface 150 may, in other words, be implemented as a single connection, or may actually represent a plurality of physical and/or logical connections. In summary, from the standpoint of the touch screen video production and control system 100, such a video source interface 150 will support video in, control out, and possibly control in. An example of such a source 170 is a remotely controlled or robotic camera 171, capable of being instructed to assume various configurations. Factors that might be configurable for a video camera 171 include PTZ; contrast; brightness; white balance; resolution; frequency; size; firmware; and potentially many more. A camera 171 might be configurable to enable or begin automatic tracking of a speaker; or the controller 141 might receive a sequence of target locations from a tracking system, the controller 141 then sending corresponding reconfiguration commands to the camera 171. For a business presentation, "configuration" might be a simple as selecting the next slide. The video source 170 might also be able respond to questions regarding its status, for example: (1) report parameter state; (2) report model or serial number; (3) report software or firmware version or configuration; (4) report physical location; or (4) report environmental variables. Such status information might be used by the controller 141 to determine how and when to control the camera 171, or might be used for other purposes, including modifying the use of a video feed 131.

Another example of a video source interface 150 that might be used in a system with video source control is a virtual camera, which depicts video derived from or calculated from the video content of one or more physical or other virtual cameras. Even a computer 174 providing still images (e.g., JPEG files) might be controlled through its video source interface 150 using, for example, a command to start a slide show, to move to the next image, or to zoom in on some particular feature.

Some system configurations might incorporate the capability to composite two or more feeds into a single feed window or into the Program output (e.g. with a picture-in-picture video). In some configurations, a commentator or presenter might be able to add annotations to an input feed for output.

Communication System

In general, a given video source 170 may connect 161 to a communication system(s) 162. This connection will at least one way (out from the video source 170), and may be two way; it must be two way for video source control of that device (although the two way communication might actually use different means and follow different pathways). Ultimately, a video feed 131 arrives at a video source interface 150 of the touch screen video production and control system 100. Data (including commands, instructions, and/or status queries) for video source control may flow in the opposite direction. Status or other information may be transmitted from source 170 back to the touch screen video production and control system 100. Between the video source 170 and the touch screen video production and control system 100 there may be any communication means, including, for example, wide area network, local area network, personal area network, cables, connectors, electrical buses, wireless communication. A given pathway between video source 170 and the touch screen video production and control system 100 may use more than one of these technologies. In FIG. 1, a cloud represents the communication system(s) 162 between various video sources 170 and the video production and control system 100.

Video Output

Video Source Control System Output

A touch screen video production and control system 100 that includes video source control but not video switching will produce a set of output videos that is a subset of the input feeds; that is, some or all of the input feeds. The video sources 170 producing these output feeds may be configured once, or reconfigured using the capabilities of the system many times while in operation during creation of a production. The operator of such a system may have discretion in selecting how the configurations of the video sources 170 change over time, and/or in selecting which video feeds from the video sources 170 are output.

However, since video source control technology may be combined with video switching technology in a single video production and control system 100, the video feeds originating from the configured and controlled video sources 170 may be immediately and directly used to provide video segments assembled in the Program video output 199 by the video switching technology part of the system 100.

Video Switching Program Output

The touch screen video production and control system 100 with video switching technology produces a video output signal, called the Program video output 199, that is based upon one or more of the feeds 131 from the video sources 170. In its simplest form, the Program video output 199 is created by switching from one input video feed 131 to another, in response to user commands received by the system 100 through its touch screen UI 111, perhaps supplemented by a control panel user interface 820. In FIG. 1, this is depicted as an arrow 190 from a video Program output connection 152 in the system 100 to some Program consumer 191. For emphasis in the figure, this is shown as a broadcast tower 192, although while the Program is being output through the video Program output connection 152, it can travel anywhere by means of any communication method, as described above in regard to communication system(s) 162, or it can be recorded and stored. There may be multiple forms of the Program video output 199, each with its own video Program output connection 152. For example, the Program output may be in digital (in various formats) and/or analog (in various formats). The Program video output 199 might in some embodiments be output through a physical Program output connector 153.

User Interface

The touch screen video production and control system 100 will have a UI 149 that includes touch screen UI 111, which has user touch controls to implement its functionality, such functionality including either video source control, video switching, or both. The UI 149 may also include a control panel 140 having tactile controls 142.

Touch Screen Interface

FIG. 1 illustrates a touch screen video production and control system 100 having both video source control and video switching. This particular illustrative embodiment includes three rows of windows, associated with video feeds 131, and a graphical user interface (GUI) 139 area which includes various other touch controls whereby a user can manipulate the system. Other touch screen UIs 111 may be configured or laid out differently, either by the system 100 or by a user through the control panel 140 or a GUI 139.

Each video feed window 130 in the middle row shows the content video feed 131 from a respective video source 170. Typically, the content of one or more of the feeds 131 will be changing and evolving as the production progresses, possibly in near real time. The bottom row shows a set of thumbnails 136, each thumbnail 136 representing a particular preset configuration of a selected video source 170. The top row of windows includes a Preview window 122 and a Program window 120. The contents of the Program window 120 will be output simultaneously (at least in terms of normal human perception) through the Program window 120 and the video Program output connection 152. A video production and control system 100 having only video source control capability might have a similar appearance, but might lack the windows appearing in this particular embodiment in the top row. One having only video source control capability might lack the thumbnail 136 windows appearing in the bottom row.

Of course, many arrangements of the touch screen 110 controls and displays are possible to achieve equivalent functionality. For example, suppose that a set of cameras 171 is configured once and only once at the start of a production. A system might provide a control to allow display of the preset thumbnails 136 to be enabled or suppressed, or to change the layout of the touch screen UI 111.

In FIG. 1, video feed windows 130 corresponding to feeds 131 from four video sources 170 are shown numbered 1-4 and having reference numbers 130a-130d, respectively. At the depicted moment in time, window #4 is marked with a star, indicating that it is displaying the feed 131 that is the current Program feed 121, which also appears in the Program window 120 above, and likewise marked with a star. Window #1, marked with a triangle, is displaying the feed that is currently the Preview feed 123; the Preview feed 123 is also being displayed in the Preview window 122, and likewise marked with a triangle. Window #3, marked with a diamond shape, is displaying a feed whose video source 170 has been selected for configuration. The bottom row contains Preset windows 135, each displaying a thumbnail 136 image that shows a particular preset configuration 137 of that video source 170. Typically, a thumbnail 136 will be an image captured with the video source 170 in the preset configuration 137 to which the thumbnail 136 corresponds. One of the thumbnails 136, namely #3B, is marked with a diamond, indicating that it is the currently selected preset 138 configuration of the video source 170 whose feed 131 is displayed in window #3.

Note that the star, triangle, and diamond figures were used to facilitate simple description of FIG. 1, and would be unlikely to appear in a real implementation of the touch screen UI 111 of a video production and control system 100. A colored border around a window is one of many possible examples of a more realistic emphasis means for indicating selection of the item represented by that window.

The touch screen UI 111 can be used to modify the configuration of a video source 170, either by changing that video source 170 to a different existing preset configuration 137, or by manual configuration, with or without creating a new preset configuration 137. For example, in FIG. 1, the video source 170 of window #4 is presently selected, and it is in the configuration displayed in the thumbnail 136 labeled #3B representing the selected preset 138. A new configuration might be selected when the system 100 senses that an operator has touched one of the other preset thumbnails 136, say #3E. At that point, the system 100 will send control data 263 to the video source 170 of window #3. The detailed instructions or data for configuring a video source 170 in a particular way might be stored in the video source 170, or in the controller 141, or split between the two. For example, the controller 141 might only need to send the video source 170 an index of a preset configuration that is stored in hardware or firmware, as instructions or parameters, on the video source 170. Selection of a different video source 170 for configuration might be done, for example, by pressing the window in the middle row for that video source 170. Of course, many other means of indicating selection are possible, such as making a choice within the GUI through a menu or a text box.

Manipulating a video source 170 into a new configuration might be done, for example, by first touching an already selected preset thumbnail 136, or by pressing a preset thumbnail 136 and holding it down for some minimum period, say four seconds. Once creation of a new preset configuration 137 is initiated, an operator might use touch controls in the touch screen UI 111 or tactile controls of a control panel 140, such as a joystick 144, to reconfigure the video source 170. In some embodiments or situations, a new configuration might be requested by sending a command in text form, or a sending set of program instructions retrieved from storage. A new configuration might (or might not) be stored, and displayed in a preset thumbnail 136.

Control Panel

A control panel with conventional tactile controls 142 might be provided to supplement the touch screen 110 for control of video source 170 configuration or control of video switching. The reasons for doing so include (1) redundancy in case of equipment failure; (2) familiarity of some system operators with some traditional controls; or (3) better performance of particular tactile controls for some operations. For example, some users feel that precise manipulation of camera PTZ configuration is better achieved with a joystick 144 than with touch screen control workalikes. Nevertheless, a touch screen 110 alone can be configured to handle all requirements to implement the UI of a system 100 having video source control and/or video switching. Such a touch screen UI 111 might employ any of the windowing and touch control techniques known in the art.

The touch screen display 112 and touch screen UI 111, controller 141, video source interfaces 150 (for video feeds and, in some embodiments, for video source control), and video Program output connections 152, and, optionally, a control panel 140 form the core of a touch screen video production and control system 100. A dashed line 101 in FIG. 1 distinguishes these core components from other components that, depending on embodiment, might be regarded as within the particular system 100 or external to it.

Controller Functionality

Figure 2:
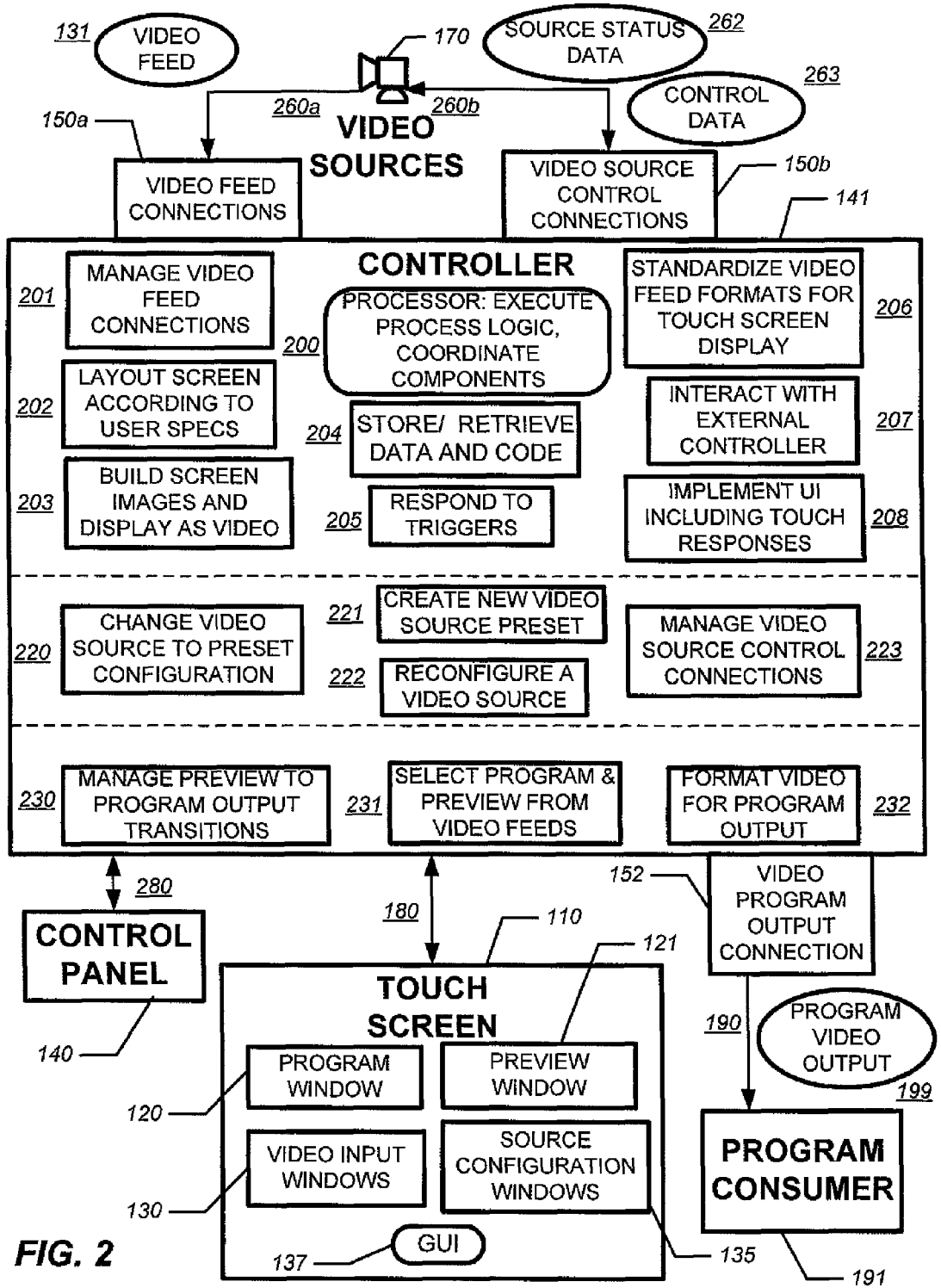
FIG. 2 is a schematic drawing illustrating the functionality of a controller in a touch screen video production and control system having video source control and video switching.

FIG. 2 is a schematic drawing illustrating the functionality of a controller 141 in a touch screen video production and control system having both video source control and video switching. The controller 141 is some combination of software and hardware to execute the logic that provides the system 100 with various kinds of functionality. The controller 141 may be housed, in whole or in part, within a structure that also includes a control panel 140. Alternatively, the controller 141, or portions thereof, might be included in a monitor whose surface is the touch screen 110. Ultimately, the controller 141 functionality must be housed in some kind(s) of hardware platform, but the division of that functionality among one or more hardware resources may vary among embodiments of the invention. Typically, the controller 141 will be housed in either a control panel 140 unit or within whatever structure houses the touch screen 110. Preferably, the controller 141 will be housed in a unit separate from the monitor (or other display device) and touch screen 110 surface, to allow these components to be easily and inexpensively purchased off-the-shelf. Indeed, the controller 141 will preferably allow itself to be configured through its UIs 149 or through an external interface so the touch screen 110 display and touch screen UI 111 can work on a range of different types of display equipment ranging from monitors to touch pads to cell phones and portable media players, as well as various types of input connections/connectors. If video source control and video switching are in separate systems, there may be two controller boxes, each possibly having a control panel 140.

The controller 141 interacts through interfaces with the environment, namely, with users, video sources 170, and Program consumers 191. A video source interface 150 may include a video feed connection 150*a* and a video source control connection 150*b*. The controller 141 receives video feeds 131 from video sources 170 through respective video feed connections 150*a*. A video source 170 feeds video to the video feed connection 150*a* through communication system 260*a*. If the system 100 has video source control, the video source 170 may have two-way communication 260*b* with a video source control connection 150*b*. The communication paths 260*a* and 260*b* may be the same or separate. The video feed connection 150*a* and the video source control connection 150*b* might likewise, for example, be implemented as a combined connector or separate connectors. If the system does not have video source control, then the video source control connections 150*b* might not be included. A video source control connection 150*b* might itself have separate input and output connections/connectors.

The controller 141 interacts with users of the touch screen 110 through connection 180 by both the touch screen display 112 and the touch screen UI 111 controls. The controller 141 arranges the layout of the touch screen 110, and the content presented there, in some systems according to user specification. The content includes, for example, content types described in reference to the touch screen 110 illustrated by FIG. 1. The touch screen 110 sends touch interaction events that include touch location to the controller 141. The controller 141 determines how to respond to such events based on how the touch screen UI 111 is laid out. The controller 141 also interacts through communication channel 280 with users of the control panel 140, if any, as described in connection with FIG. 1.

The controller 141 interacts with a Program consumer 191 though a video Program output connection 152 The video Program output connection 152 might be implemented as a connector or in some other way, such as a transmitter.

Central to the controller 141 is a processor 200, which includes whatever hardware and software are used by the controller 141 to execute required logic and to coordinate the various components of the touch screen video production and control system 100. The processor 200 might include one or more microprocessors, logical gates, software instructions, hardware storage, and so forth. The logic of the controller 141 is best defined by what it does. Three categories of functionality, separated in FIG. 2 by dashed lines, are described below.

Any touch screen video production and control system 100 will have a controller 141 that may have some or all of the following general functions: manage 201 the video source interfaces 150; store/retrieve 204 any data and code needed by the controller 141 to carry out its functions; standardize 206 video feeds formats for touch screen display; lay out 202 the UI, potentially according to user specifications; build 203 the screen images and display them as video; implement 208 the touch screen UI 111, including responding to touch events; respond 205 to triggers or tracking information from external sources by automatically; and interact 207 with some external control system, for example to update software or firmware on the system 100, or to test the system.

The controller 141 of a touch screen video production and control system 100 having touch screen video source control may have some or all of the following functions: manage 223 the video source control connections 150b to the system 100; cause 220 a video source 170 to configure itself according to a preset configuration 137; reconfigure 222 a video source 170 using touch screen UI 111 controls; create and store 221 a new preset configuration 137.

The controller 141 of a touch screen video production and control system 100 having touch screen video switching may have some or all of the following functions: select 231 the Program feed 121 and Preview feed 123 from among the input feeds 131; manage 230 transitions from Preview feed 123 into Program feed 121 according to the current user-selected transformation mode; and format 232 the Program feed 121 for Program video output 199 to Program consumers 191.

Selection of a Preset Configuration

Figure 3:
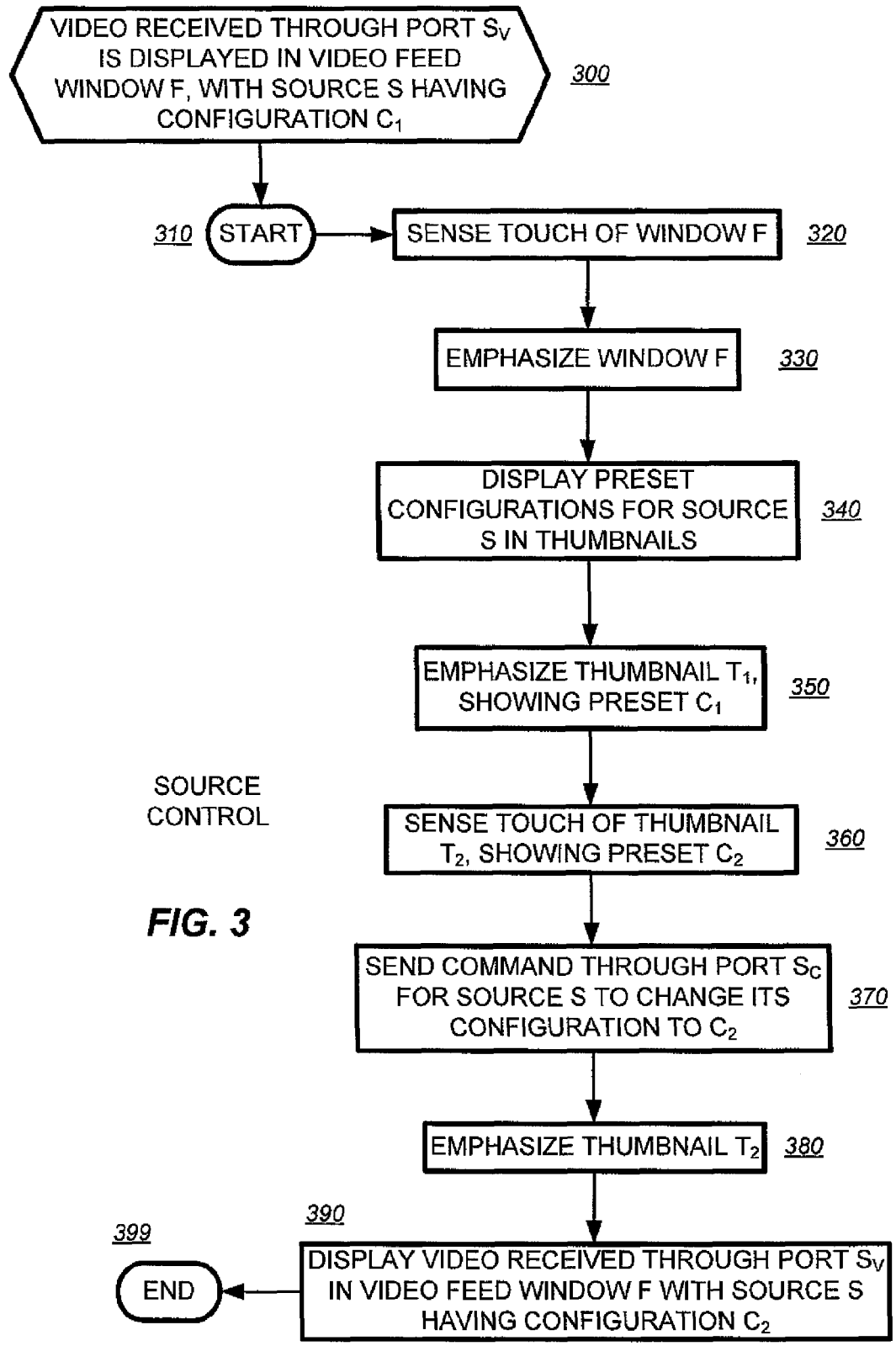
FIG. 3 is a flowchart illustrating one approach to using touch screen video source control to select a preset configuration of a video source.

FIG. 3 is a flowchart illustrating, in an embodiment of the invention, one possible implementation of the use of touch screen video source control to select a preset configuration 137 of a video source 170. In this and the other flowcharts, text displayed in a hexagon depicts an assumed state of the system 100 prior to the start of the particular process.

In this flowchart, $S_v$ is a video feed connection 150a or port to a video source 170 S. F is a window, as in the middle row of the touch screen 110 of FIG. 1, displaying the video feed from video feed connection 150a. $T_1$ is a thumbnail 136 representation of preset configuration 137 $C_1$, and $T_2$ is a thumbnail 136 representation of preset configuration 137 $C_2$ of the feed 131.

At the start 310 of the process, video received through port $S_v$ is being displayed 300 in video feed window F. The source S of the video feed has an initial configuration of $C_1$.

A touch is sensed 320 of window F. In this embodiment, such a touch selects F, as well as the video source control connection 150b that corresponds to F. Other methods of implementing such selection are, of course, possible within the scope of the invention. Indeed, in other instances in this and other flowcharts, the practitioner of ordinary skill in the art will recognize that there are other equivalent methods to achieve the same effect, and for clarity we will dispense with further caveats of this kind in the flowcharts. FIG. 10 depicts one such alternative scheme.

Window F is somehow highlighted 330 to indicate its selection. In thumbnails 136, the preset configurations 137 corresponding to port $S_v$ (and, in turn, to S) are displayed 340, for example, as in the bottom row on the touch screen 110 of FIG. 1. The thumbnail 136 $T_1$ for preset configuration 137 $C_1$ is emphasized or highlighted 350 to indicate that it is the currently selected preset configuration 137 being used by video source 170 S to display the video feed 131.

A touch is sensed 360 of thumbnail 136 $T_2$. The touch screen 110 first senses the event, which the controller 141 interprets, in this embodiment, as a user request to change to the corresponding preset configuration 137 $C_2$. The controller 141 sends 370 a command (control data 263), through the video source control connection 150b $S_c$ corresponding to $S_v$, asking S to change its configuration to $C_2$. The controller 141 causes the touch screen 110 to indicate 380 the thumbnail 136 $T_2$ corresponding to $C_2$ as selected. Barring difficulty, S changes its configuration in response to the command sent through its video source control connection 150b, so now the system 100 displays 390 video received through port $S_v$ in window F with S now having configuration $C_2$. The process ends 399.

Selection of a Business Presentation Software Slide

Figure 4:
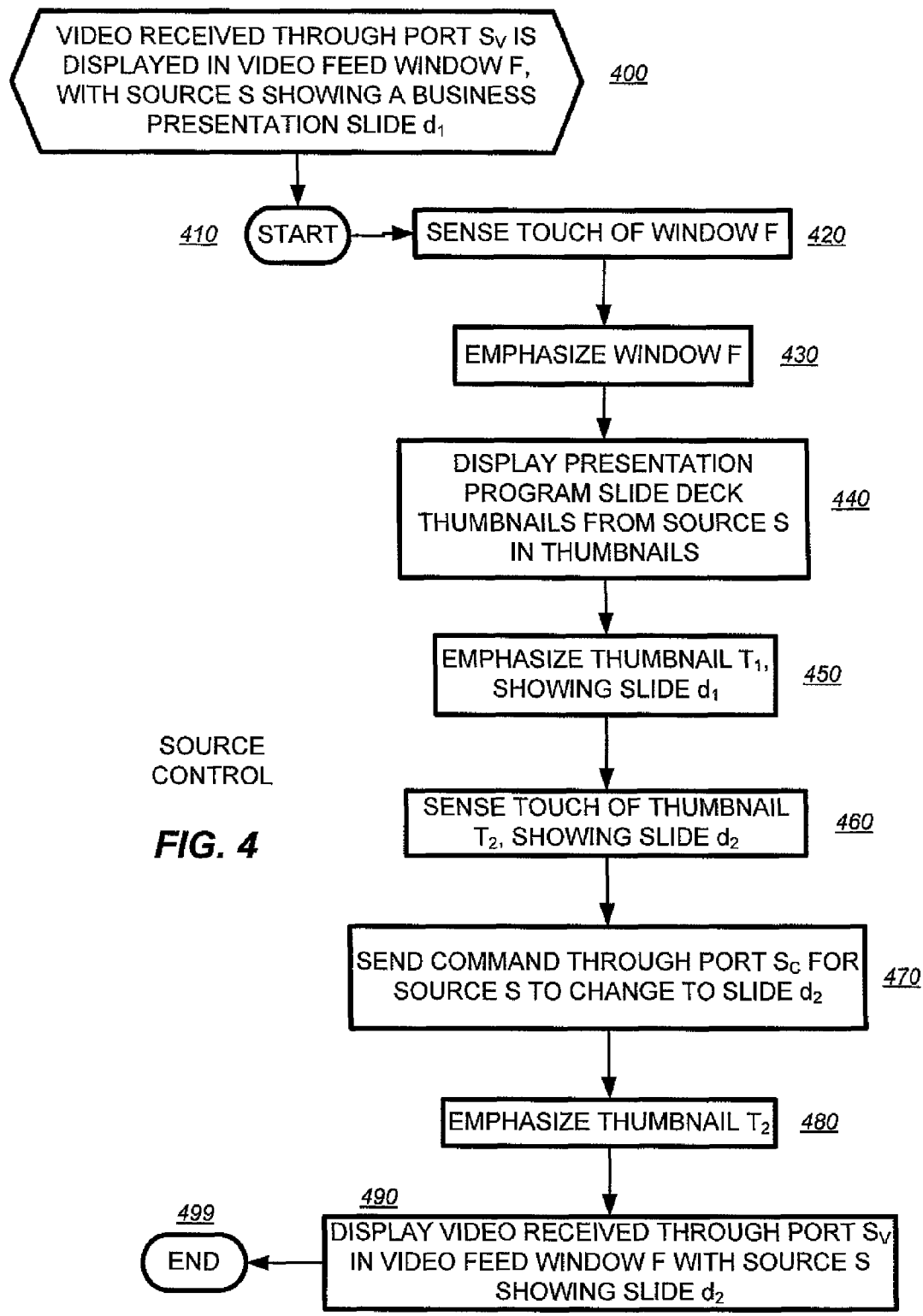
FIG. 4 is a flowchart illustrating one approach to using touch screen video source control to select a preset presentation video slide from a video source.

FIG. 3 is the kind of video source control that might be used with, for example, a remote control camera 171. In contrast, FIG. 4 is a variation video source control, where the video feed consists of business presentation software slides in an embodiment of the invention.

At the start 410, video received through port $S_v$ is being displayed 400 in video feed window F, with source S showing a slide $d_1$. A touch is sensed 420 by the controller 141 of window F. This touch causes F to be emphasized or highlighted 430 and thumbnails 136 of the slides from video source S to be displayed 440, with $T_1$ showing slide $d_1$ being highlighted 450. A touch is now sensed 460 of thumbnail 136 $T_2$, which displays slide $d_2$. Through control port $S_c$, S is commanded 470 to change to slide $d_2$. Selection of the new thumbnail 136 slide is indicated 480. Presumably, S changes its configuration in response to the command sent through its video source control connection 150b, so now the system 100 displays 490 video received through port $S_v$ in window F with S now having configuration $C_2$. The process ends 499.

Creation of a New Preset Configuration

Figure 5:
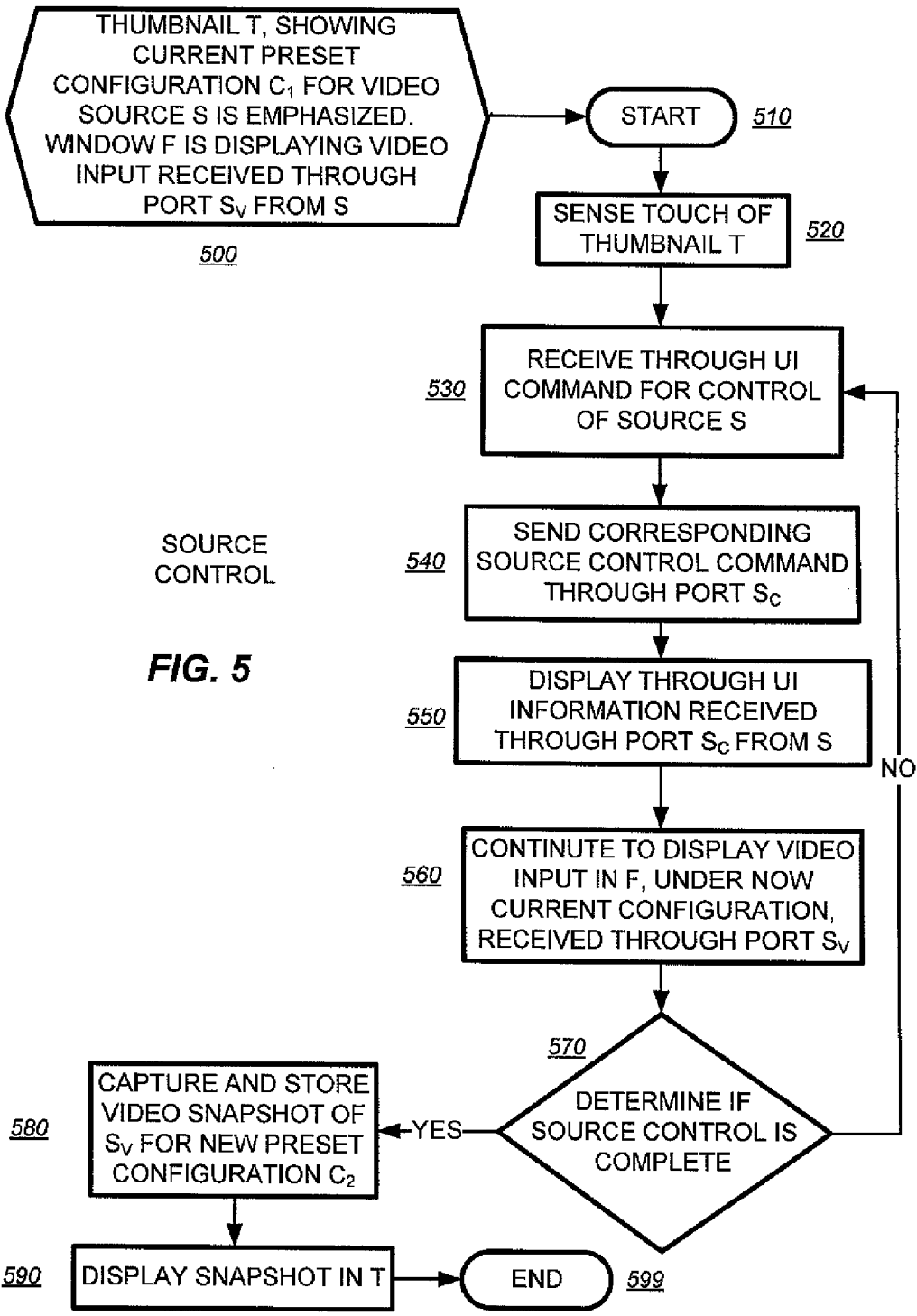
FIG. 5 is a flowchart illustrating one approach to using touch screen video source control to create a new preset configuration of a video source.

FIG. 5 is a flowchart illustrating, in an embodiment of the invention, the use of touch screen video source control to create a new preset configuration 137 of a video source 170. At the start 510, initially 500 the thumbnail 136 T showing the current preset configuration 137 $C_1$ for video source 170 S is emphasized. Window F is displaying a video feed received through port $S_v$ from S. A user touch of thumbnail 136 T is then sensed 520. The controller 141 could at this point enable user controls for configuration of S. In any case, some command is received 530 through the UI for control of S. The controller 141 sends 540 a corresponding command through control port $S_c$. (Logically it is the same command, but physically the commands received by the controller and sent to through $S_c$ are probably different in form and/or in content.) For example, the command might change a PTZ setting of a camera 171. The command might cause S to send some feedback to the system 100 through $S_c$, which would then be displayed 550 for the user on the touch screen 110. The video feed 131 from video source 170 continues to be displayed 560 in F, but now according to the new preset configuration 137 resulting from the user command. If 570 the user has more commands, then the flow returns to step 530. Otherwise, a snapshot captured from the current input feed from S is stored 580, and is displayed 590 in the thumbnail 136 T. The process ends 599. Note that in some embodiments, reconfiguration of a video source 170 alone does not necessarily cause a change of preset configuration 137 and thumbnail 136; a change in preset configuration 137 requires a separate step. The scheme illustrated by FIG. 10 is of this type.

Selection of a New Feed as the Preview Feed

Figure 6:
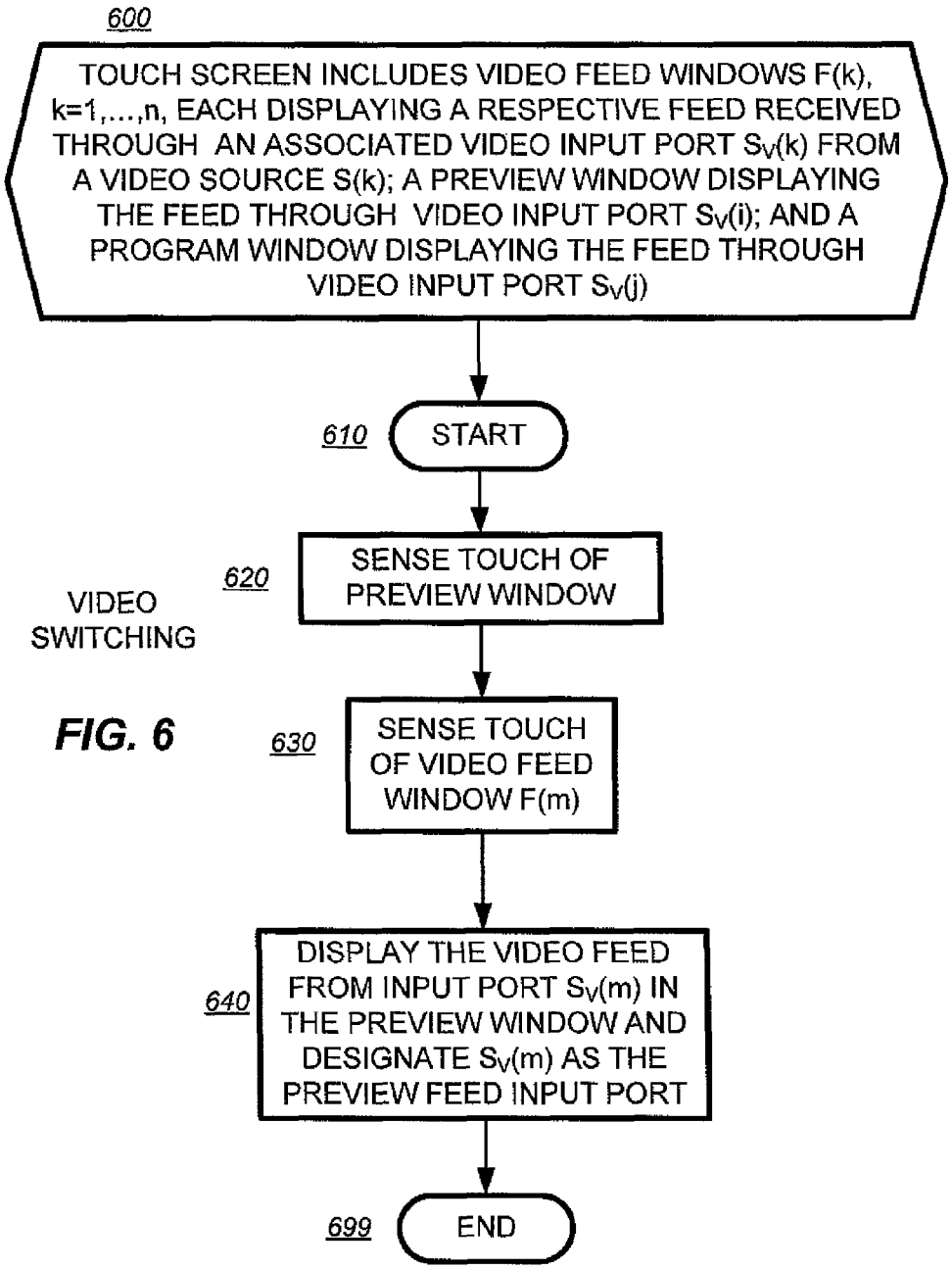
FIG. 6 is a flowchart illustrating one approach to using touch screen video switching to select the Preview video feed from a set of input video feeds.

FIG. 6 is a flowchart illustrating, in an embodiment of the invention, the use of touch screen video switching to select the Preview video feed 131 from a set of input video feeds 131. At the start 610, the touch screen 110 includes 600 n video feed 131 windows F(k), k=1, ..., n, each displaying a respective feed received through an associated video input port $S_v$ (k) from a video source S(k); a Preview window displaying the feed through video input port S_v (i); and a Program window displaying the feed through video input port S_v (j). Then a touch of the Preview window is sensed 620, followed by a touch 630 of a video feed 131 window F(m). The controller 141 now causes 640 the video feed 131 from S_v (m) to be displayed in the Preview window, and S_v (m) to be designated as the Preview input port. The process ends 699. Again, FIG. 10 shows an alternative implementation of this functionality.

Transition of the Preview Feed to the Program Feed

Figure 7:
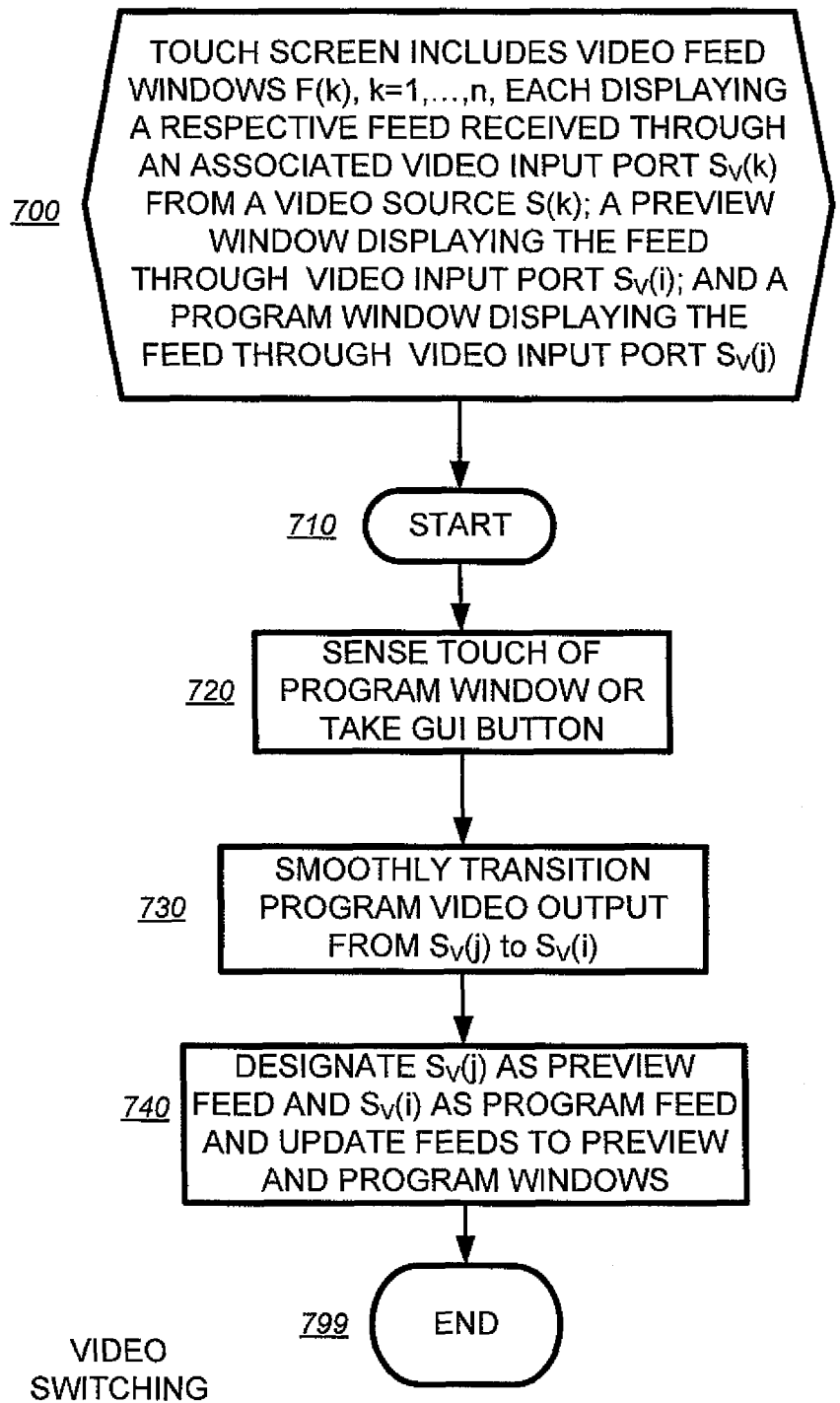
FIG. 7 is a flowchart illustrating one approach to using touch screen video switching to promote and transition the Preview video feed to the Program video feed.

FIG. 7 is a flowchart illustrating, in an embodiment of the invention, the use of touch screen video switching to promote the Preview video feed 131 to the Program video feed 131. At the start 710, the touch screen 110 includes 700 n video feed 131 windows F(k), k=1, ..., n, each displaying a respective feed received through an associated video input port S_v (k) from a video source S(k); a Preview window displaying the feed through video input port S_v (i); and a Program window displaying the feed through video input port S_v (j). Then a touch is sensed 720 by the controller 141 of the Program window, or some other touch, such as the press of a "Take" button, is sensed that indicates a transition of the Preview feed to Program is desired. The Preview feed is then transitioned 730 to Program, according to a previously specified setting of transition type (e.g., crossfade or cut). The old Program feed becomes 740 the new Preview feed. The process ends 799.

Controller Configuration

Processor

Figure 8:
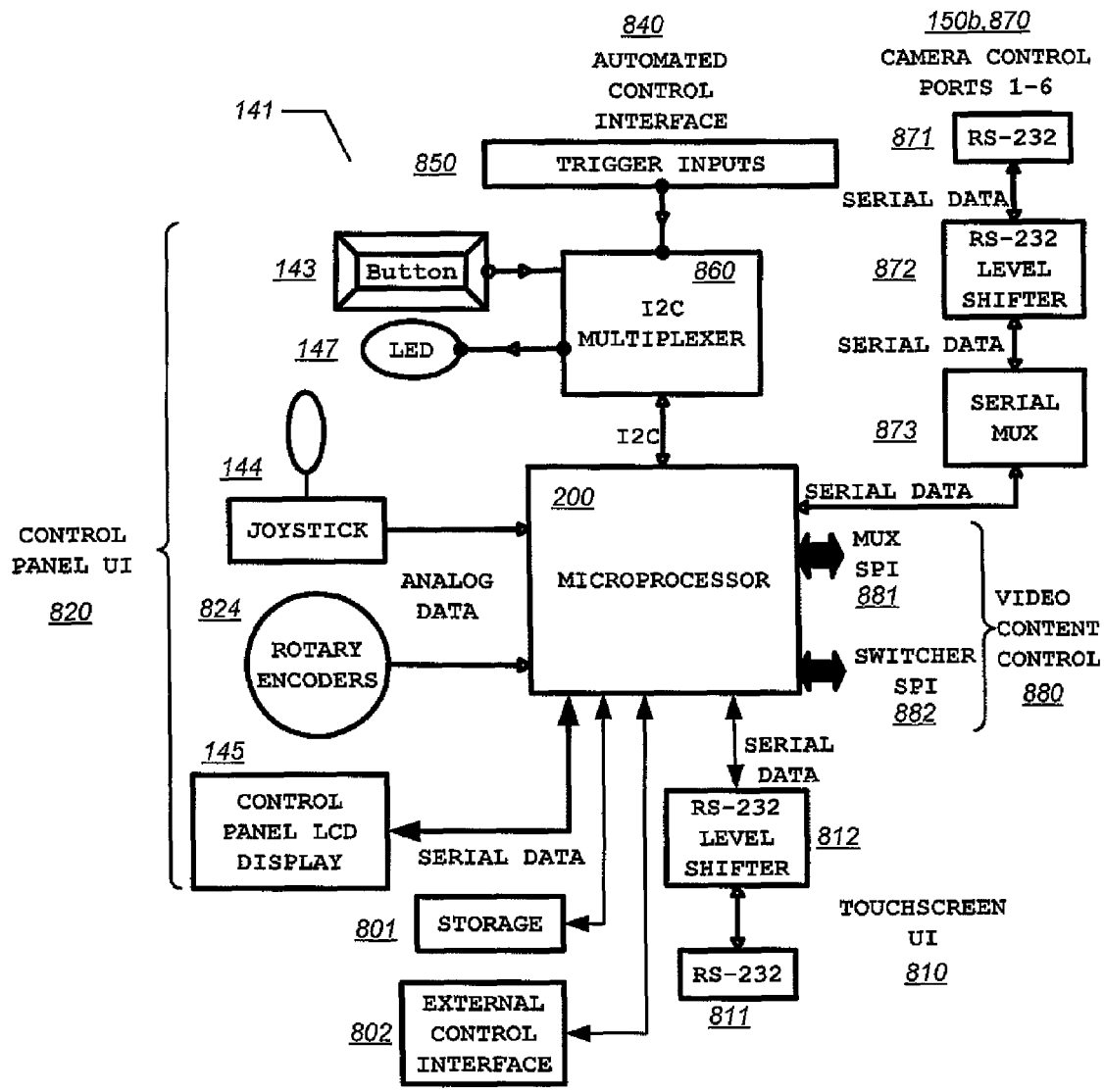
FIG. 8 is a block diagram of controller components in a touch screen video production and control system.

FIG. 8 gives an overview of the structure of a controller 141 in an exemplary touch screen video production and control system 100. Under supervision of a processor 200, the controller 141 provides functionality similar to that shown in FIG. 2.

The processor 200 interacts with users through the touch screen control interface 810 controls, such as window presses; take button; controls for transformation from Preview to Program; controls for camera configuration; and other controls provided by the GUI 139. Some or all of the functionality provided by the touch screen 110 controls may be provided through the control panel user interface 820. The touch screen control interface 810 communicates with the processor 200 using serial communications through a touch screen RS-232 level shifter 812 and a touch screen RS-232 connector 811.

This touch screen video production and control system 100 is designed to receive input feeds from, and to control, up to six video sources 170, which are remote control or robotic cameras 171 in this particular embodiment. The controller 141 interacts with the cameras 171 through camera control ports 870, which are RS-232 connectors 871. Serial communication between the processor 200 and these ports uses a level shifter 872 and a serial MUX 873.

The processor 200 communicates with the control panel 140 through the control panel user interface 820 using serial communication for a control panel display 145; analog communication for a joystick 144 and for rotary encoders 824, such as might receive input from a knob 146 or dial; and I2C bus communication via I2C multiplexer 860 to buttons 143 and LEDs 147 on the control panel 140.

This touch screen video production and control system 100 provides an automated control interface 840 with external sources, which can cause the controller 141 to perform operations similar to those that may be requested by a human user through the touch screen control interface 810 or the control panel user interface 820. For example, when a speaker steps on a mat near a whiteboard, that may cause a trigger input 850 to the controller 141; the controller 141 may be programmed to respond by configuring a particular camera 171 to focus on the speaker. This interface might also be used, for example, to track a speaker as the speaker moves around a stage. This kind of camera 171 control is described in U.S. patent application Ser. No. 11/527,120. The automated control interface 840 might cause the controller 141 to perform any of the functions shown in FIG. 2, such as promoting a video feed from Preview to Program.

The processor 200 also utilize hardware storage 801 as needed to store instructions and data. An external communication interface 802 is provided to allow an external device to communicate data and software to the controller 141, and to update firmware.

Video Content Control

Figure 9:
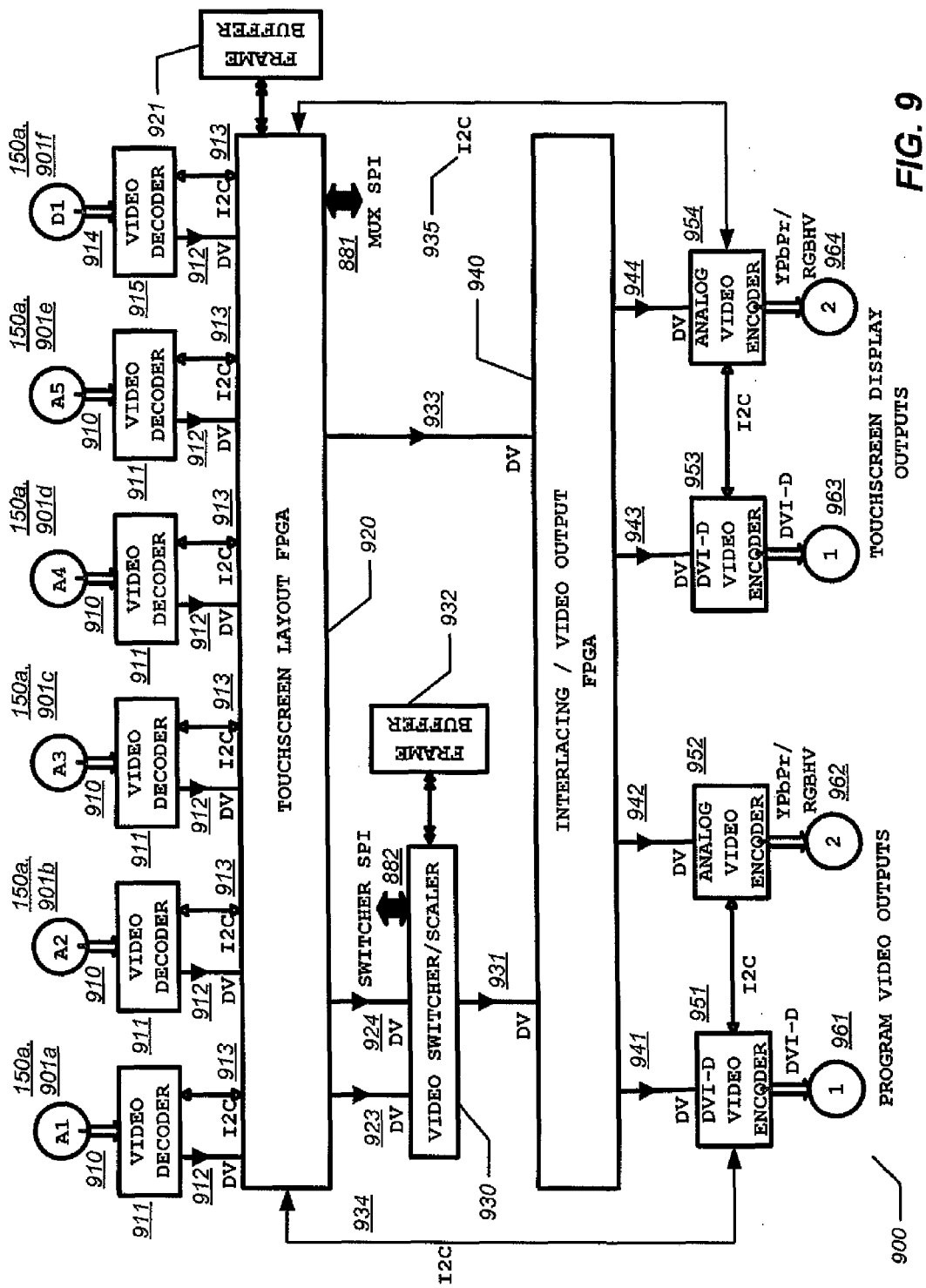
FIG. 9 is a block diagram of a video control subsystem of the controller in a touch screen video production and control system.

The processor 200 exercises video content control 880 over the touch screen 110 and the video Program output connection 152 using MUX Serial Peripheral Interface (SPI) 881 and Switcher SPI 882. FIG. 9 shows an exemplary implementation of a video content subsystem 900 in a touch screen video production and control system 100 that has video switching technology.

The video feeds 131 are received by the video content subsystem 900 through video feed connections 150a, implemented as analog signal 910 via ports A1 901a through A5 901e and digital signal 914 via port D1 901f. The analog signals 910 and the digital signal 914 are converted to a common format, here 8-bit color digital video (DV) 912, using analog decoders 911 and digital decoder 915. A touch screen layout FPGA 920 controls how the decoders standardize each input feed signals using I2C bus 913. The controller 141 uses I2C buses for control in a number of contexts; a typical one is labeled I2C 935.

In other embodiments, a variety of source connections might be implemented by plug-in devices (e.g., circuit cards) that do the bulk of the format standardization according to specifications from the controller 141.

The touch screen layout FPGA 920 operates under control of the processor 200 via MUX SPI 881. The touch screen layout FPGA 920 arranges the display of the touch screen 110 monitor or other visualization device from the video feeds 131. It performs operations of multiplexing, scaling, arrangement of windows (such as video feed window 130, thumbnails 136, Program window 120, Preview window 122, and GUI 139) on the screen, and formatting of the video content. In this embodiment, the touch screen layout FPGA 920 creates the entire content of the touch screen 110 one frame at a time, sending 933 the frames sequentially to interlacing FPGA 940. The touch screen layout FPGA 920 uses frame buffer 921 to ensure smooth sequencing of the input signal. The touch screen layout FPGA 920 also controls formatting of the Program and touch screen output signals through I2C buses connected to Program output digital encoder 951, Program output analog encoder 952, touch screen display digital (DVI-D) encoder 953, and touch screen display analog encoder 954.

The interlacing FPGA 940 interlaces the output signals if appropriate for the display, and communicates with the output encoders. The touch screen 110 display signal, including the content of all the windows and GUI 139, is sent 943 as DV to touch screen display digital (DVI-D) encoder 953 where it is reformatted into output digital signal, here DVI-D, and sent through touch screen digital output port 963 to the touch screen 110 (if the touch screen 110 display is digital). Similarly, the touch screen 110 display signal is sent 944 as DV to touch screen display analog encoder 954 where it is reformatted into output analog (in this case, YPbPr or RGBHV) signal, and sent through touch screen analog output port 964 to the touch screen 110 (if the touch screen 110 display is analog). Communication 180 between controller 141 and touch screen 110 includes the display output through touch screen digital output port 963 or touch screen analog output port 964, as well as control communication through touch screen RS-232 connector 811.

The processor 200 controls video switcher 930 through Switcher SPI 882 according to the then-current transition mode. The video switcher 930 manages transitions of Preview feed 123 to Program feed 121. It receives those feeds as inputs 923 and 924, and produces a single Program output signal 931. It uses frame buffer 932 to ensure a smooth output signal. This signal is processed similarly to the signal 933 for the touch screen 110 monitor, including signals 941 and 942, encoders 951 and 952, and digital 961 and analog 962 output ports. The Program video output 199 is the output from ports 961 and 962.

Alternative Touch Screen Video Source Control and Switching Commands

FIG. 3-7 described in detail one set of touch screen 110 commands for video source control and video switching. In the table of FIG. 10, we illustrate another scheme, one of many possibilities approaches within the scope of the invention for providing such functionality to the touch screen UI 111. The table has columns, corresponding to type 1000 of touch screen video production and control system, initial state 1001 of the system 100 before the command; the response 1002 desired by the user when executing the command; the action 1003 performed by the user and sensed by the system; and the consequences 1004, direct and possibly secondary. The type 1000 is either "SC", indicating an operation that would be more likely to be supported in a system with video source control; or "VS" indicating an operation that would be more likely to be supported in a system with video switching. All the operations would be appropriate for a system 100 with both video source control and video switching.

The table has five rows, representing a user operation through the touch screen UI 111. Referring back to the touch screen 110 display of FIG. 1 should be helpful in following the following discussion.

Operation 1020 is promoting a video feed 131 from Preview to Program. We assume, for the sake of illustration, that Feed 2 is the current Program feed 121 and Feed 4 is the current Preview feed 123. The system 100 senses that the Preview window 122 has been pressed. The Program feed 121 is transitioned, according to the transition method chosen by the user, into Feed 2. Feed 2 is sent to Program video output 199 to Program consumers 191. Feed 4 is transitioned according to the current transition mode into the new Preview feed.

As a result of the previous operation, Feed 4 is the Program feed and Feed 2 is Preview. Operation 1021 is promoting a video feed 131 (other than the Program feed), in this case Feed 1, to Preview. A press by the user of feed window 1 is sensed. Feed 1 is displayed in the Preview window, and the set of preset configurations for Feed 1 are displayed as thumbnails. The preset currently selected for Feed 1 is emphasized.

After the previous operation, the user wants to change 1022 the video source 170 for Feed 1 to a different preset configuration, namely 1E. The system 100 senses a user press of thumbnail 1E, and sends control data 263 to the video source 170, which responds by changing to the corresponding preset configuration. This modifies the view being presented by video in the Preview window. Thumbnail 1E is emphasized or highlighted.

After the previous operation, the user decides to interactively modify 1023 the configuration of the video source 170 for Feed 3 using controls in the touch screen UI 111 or the control panel 140. The user presses and holds the Feed 3 window for at least four seconds. Feed 3 is promoted to Preview. An inset is shown in the Feed 3 window having the same size as a thumbnail 136 to indicate that configuration is in progress. The user can see the Feed 3 view from the video source 170 in this inset. Pressing the Feed window again ends the reconfiguration, but note that it does not save the new configuration as a preset. To do so 1024, while the inset is still visible, the user can press one of the thumbnails for Feed 3. That thumbnail and corresponding preset will be replaced by corresponding ones for the new configuration.

Separate Video Switching System

Figure 11:
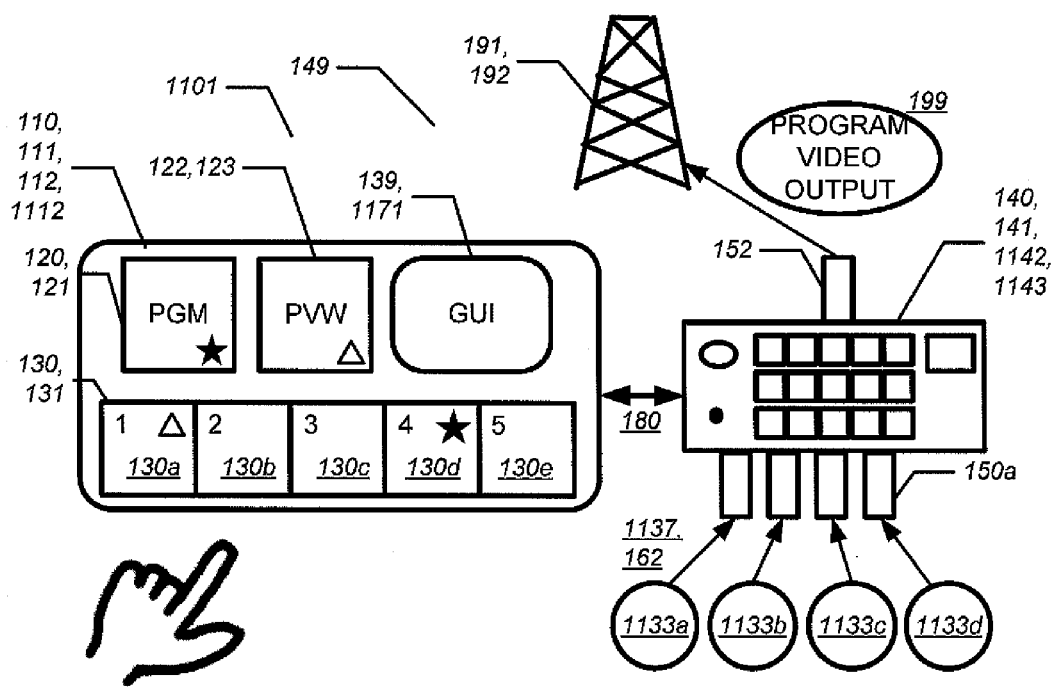
FIG. 11 is a schematic drawing of a touch screen video production and control system having video switching.

FIG. 11 illustrates how the touch screen video switching functionality of a touch screen video production and control system 100 can be implemented as a video switching system 1101 separate from the touch screen video source control functionality. Such a video switching system 1101 might nevertheless be combined in a single system—possibly even housed within a single box—with components that do video source control using a method that does not have the innovative touch screen aspects described in this and related patent documents. Alternately, remote video source control might be performed by an entirely separate system, or not at all.

The video switching system 1101 includes touch screen video switching aspects of the combined system already described. Since most of the elements of these figures should be familiar to the reader from previous figures and associated text, we will concentrate on elements that are specific to a separate video switching system 1101, as contrasted with the combined system of FIG. 1.

Like the combined system 100, the touch screen user interface 1112 of video switching system 1101 has a set of video feed windows 130, a Program window 120 displaying a Program feed 121, and a Preview window 122 displaying a Preview feed 123. The functionality of these windows is described in FIGS. 6 and 7 and in FIG. 10 for operations designated to be of type "VS". The GUI 1171 will include controls relevant to video switching, for example, controls to define mode of transition of the Preview feed 123 into the Program feed 121; to promote a feed 131, displayed in a video feed windows 130, into the Preview feed 123, displayed in the Preview window 122. The video switching system 1101 has a controller 1143, and possibly a control panel 1142. Note the (optional) absence of a joystick 144 in the illustrated system, which does not facilitate configuration of video sources 170.

Input to the video switching system 1101 is through video feed connections 150a from sources 1133a-1133d. The number of video input feeds Preview window 122 can be arbitrarily large. Some, and perhaps all of these might be feeds configured and output by a video source control system, possibly a video switching system 1101. Since the illustrated video feed connections 150a do not have video source control, the communication systems 1137 are shown with one-way arrows. Each communication systems 1137 might be of any type, as described in reference to FIG. 1. The output feed from the communication systems 1137 is Program video output 199.

Figure 12:
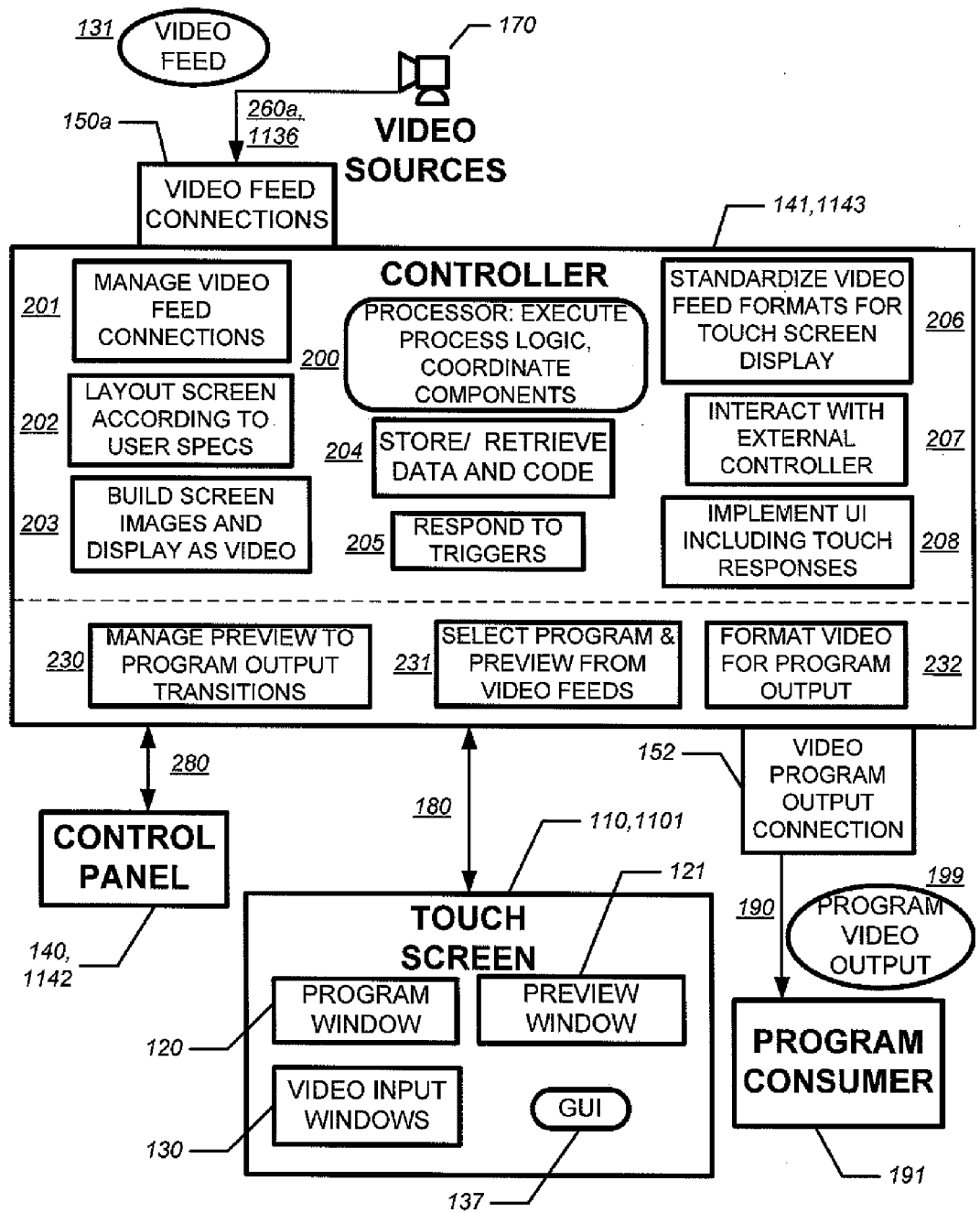
FIG. 12 is a schematic drawing illustrating the functionality of a controller in a touch screen video production and control system having video switching.

The functionality of the controller 1143 in a video switching system 1101 is illustrated by FIG. 12. This figure will not be described in detail. The functional aspects of the controller 1143 are a subset of those previously detailed in reference to FIG. 2, and all reference numbers in the figure have already been identified in the text.

The video source control components of FIG. 8, such as RS-232 connectors 871, are not necessary in a video source control system 1100. Everything illustrated by FIG. 9 may still be relevant.

Conclusion

Throughout this document, the word "or" should be interpreted as "inclusive or" unless otherwise clear from the context. Also, the word "each" is used in some of the claims. The reader should note that if A includes Bs, such that each B contains property P, then A might also include Bs that do not have property P.

Of course, many variations of the above method are possible within the scope of the invention. The present invention is, therefore, not limited to all the above details, as modifications and variations may be made without departing from the intent or scope of the invention. Consequently, the invention should be limited only by the following claims and equivalent constructions.

What is claimed is:

1. An apparatus, comprising:
   a) a plurality of video source interfaces, each of the video source interfaces including a respective video feed connection, each video feed connection receiving a video feed;
   b) a touch screen, which displays
      (i) video feed windows, each video feed window showing the content of a corresponding video feed,
      (ii) a Program window, showing content from a first video feed, selected from the plurality of video source interfaces as a Program feed, and
      (iii) a Preview window, showing content from a second video feed, selected from the plurality of video source interfaces as a Preview feed;
   c) a video Program output interface, through which the content of the first video feed is transmitted; and
   d) a controller, which
      (i) receives touch events from the touch screen,
      (ii) upon interpreting a touch event as requesting that a given video feed become the Preview feed, selects the given feed as the Preview feed and displays content from the given feed in the Preview window, and
      (iii) upon interpreting a touch event as requesting that the Preview feed become the Program feed (A) selects the second feed as the Program feed, (B) displays content from the second feed in the Program window, and (C) transmits the content of the second feed through the video Program output interface.

2. The apparatus of claim 1, wherein the controller, upon interpreting a touch event as requesting the Preview feed become the Program feed, transitions the content shown in the Program window from the first video feed to the second video feed according to a transition mode.

3. The apparatus of claim 2, wherein the controller, upon interpreting a touch event as a choosing a transition mode, saves the transition mode in storage for subsequent transitions.

4. The apparatus of claim 2, wherein the transition mode is cut, fade, crossfade, or wipe.

5. The apparatus of claim 1, wherein the controller interprets a touch that is sensed in a video feed window as requesting that the corresponding video feed become the Preview feed.

6. The apparatus of claim 1, wherein the controller interprets a touch that is sensed in the Preview window as requesting that the corresponding video feed become the Program feed.

7. The apparatus of claim 2, wherein the controller interprets a touch that is sensed in the Program window as requesting that the video feed corresponding to the Preview feed become the Program feed.

8. A method, comprising:
   a) receiving a plurality of video feeds;
   b) displaying the content of each video feed in a corresponding video feed window on a touch screen;
   c) selecting a first video feed as a Program feed;
   d) displaying the content of the Program feed in a Program feed window on the touch screen;
   e) selecting a second video feed as a Preview feed;
   f) displaying the content of the Preview feed in a Preview feed window on the touch screen;
   g) transmitting the content of the Program feed through a Program output connection;
   h) interpreting a touch event from the touch screen as a request to select a third video feed as the Preview feed; and
   i) selecting the third video feed as the Preview feed.

9. The method of claim 8, wherein a touch event indicating a touch of a given video feed window is interpreted as a request to select the corresponding video feed as the Preview feed.

10. The method of claim 8, wherein a touch event indicating a touch of the Program window is interpreted as a request to designate the video feed selected as the Preview feed to become the Program feed.

11. The method of claim 8, wherein a touch event indicating a touch of the Preview window is interpreted as a request to designate the video feed selected as the Preview feed to become the Program feed.

12. The method of claim 8, wherein a touch event indicating a touch of a take touch control is interpreted as a request to designate the video feed selected as the Preview feed to become the Program feed.

13. A method, comprising:
   a) receiving a plurality of video feeds;
   b) displaying the content of each video feed in a corresponding video feed window on a touch screen;
   c) selecting a first video feed as a Program feed;
   d) displaying the content of the Program feed in a Program feed window on the touch screen;
   e) selecting a second video feed as a Preview feed;
   f) displaying the content of the Preview feed in a Preview feed window on the touch screen;
   g) transmitting the content of the Program feed through a Program output connection;
   h) interpreting a touch event from the touch screen as a request to select the Preview feed to become the Program feed; and
   i) designating the video feed selected as the Preview feed to be the Program feed.

14. The method of claim 13, further comprising:
   j) designating the video feed selected as the Program feed to be the Preview feed.

15. The method of claim 13, further comprising:
   j) transitioning the content of the Program feed window to the content of the Preview feed using a saved transition mode.

16. The method of claim 13, further comprising:
   k) interpreting a touch screen event as a request to set the transition mode to a particular type; and
   l) storing the particular type as the transition mode for subsequent transitions.

17. An apparatus, comprising:
   a) a touch screen;
   b) a set of video source interfaces, each video source interface including a video feed connection;
   c) a Program output connection; and
   d) a controller, which (i) displays the content of video feeds from the video feed connections in respective windows on the touch screen,
(ii) displays the content of one of the video feeds in a Program window as a Program feed, and transmits the content of the Program feed through the Program output connection,
(iii) displays the content of one of the video feeds in a Preview window as a Preview feed,
(iv) interprets certain types of touch screen event as requests, respectively, to
　(A) promote the current Preview feed to become the Program feed, or
　(B) select one of the video feeds to become the Preview feed, and
(v) upon receiving a touch screen event, executes the respective request.

\* \* \* \* \*